(12) United States Patent
Josef et al.

(10) Patent No.: US 8,475,558 B2
(45) Date of Patent: Jul. 2, 2013

(54) PREPARATION OF A POTASSIUM PHOSPHATE BASED COMPOSITION

(75) Inventors: Alexander Josef, Arad (IL); Itshak Zukerman, Arad (IL)

(73) Assignee: Rotem Amfert Negev Ltd., M.P. Arava (IL)

( * ) Notice: Subject to any disclaimer, the term of this patent is extended or adjusted under 35 U.S.C. 154(b) by 362 days.

(21) Appl. No.: 12/744,964

(22) PCT Filed: Nov. 13, 2008

(86) PCT No.: PCT/IL2008/001498
§ 371 (c)(1), (2), (4) Date: Aug. 3, 2010

(87) PCT Pub. No.: WO2009/072106
PCT Pub. Date: Jun. 11, 2009

(65) Prior Publication Data
US 2010/0311584 A1    Dec. 9, 2010

(30) Foreign Application Priority Data
Dec. 3, 2007 (IL) .......................... 187829

(51) Int. Cl.
*C05D 9/00*     (2006.01)
*C05D 9/02*     (2006.01)
*C05B 7/00*     (2006.01)
*C05B 17/00*    (2006.01)

(52) U.S. Cl.
USPC ...................... 71/33; 71/31; 71/32

(58) Field of Classification Search
USPC ...................................... 71/31–36
See application file for complete search history.

(56) References Cited

FOREIGN PATENT DOCUMENTS

| DE | 22 42 937 | 3/1974 |
| DE | 25 01 959 | 7/1976 |
| EP | 0 227 884 | 7/1987 |
| FR | 2 086 213 | 12/1971 |
| WO | 00/76941 | 12/2000 |
| WO | 2004/063126 | 7/2004 |

OTHER PUBLICATIONS

Cichy et al. "Potassium multiphosphates for food processing". Polish Journal of Chemical Technology, 9, 3, 86-90, 2007.*
Database Chemabs [Online] Chemical Abstracts Service, Ohio, US; Dec. 16, 2006, Berg, L.G. et al: "Double salts of.. orthophosphate", XP002540369, access No. 35:22392, & Izvestiya Akademii Nauk SSSR, Seriya Khimicheskaya 877-84.
International Preliminary Report on Patentability for corresponding PCT application, 6 pages, mailed Jun. 8, 2010.

* cited by examiner

Primary Examiner — Kaj K Olsen
Assistant Examiner — Jennifer Smith
(74) Attorney, Agent, or Firm — Roach Brown McCarthy & Gruber, P.C.; Kevin D. McCarthy

(57) ABSTRACT

Provided is a freely flowing particulate fertilizer essentially consisting of potassium phosphate of the formula $K_3H_3(PO_4)_2$ and of less than 8 wt % water. The stable and not caking fertilizer is characterized by an XRD signal corresponding to 2-theta of about 70°. An economic process for making the fertilizer is also provided consisting in reacting KOH and monopotassium phosphate ($KH_2PO_4$) in water, heating the mixture under vacuum and cooling it down, thereby obtaining the particulate fertilizer.

9 Claims, 1 Drawing Sheet

PREPARATION OF A POTASSIUM PHOSPHATE BASED COMPOSITION

REFERENCE TO CO-PENDING APPLICATIONS

Priority is claimed as a 371 of international of PCT/IL2008/001498, filed on Nov. 13, 2008, which claims priority to Israeli patent application number 187829 filed on Dec. 3, 2007.

FIELD OF THE INVENTION

The present invention relates to a method of manufacturing a particulate fertilizer comprising potassium phosphates, which is easy to store and use, without tending to cake.

BACKGROUND OF THE INVENTION

Potassium phosphates, offering to the plants two important elements, are important fertilizers; however, in many of their forms, said phosphates are unstable, and they are difficult to store and manipulate. An ideal agrochemical fertilizer would provide the important elements necessary for the plant growth, while also having appropriate physical properties, being easily manufactured, packed and handled. Ideally, such fertilizer would be adapted to form granules or powders that are free-flowing and not tending to agglomerate. Of course, the art still does not provide enough suitable fertilizers for the all situations, having the required characteristics.

Monopotassium phosphate (MKP) and dipotassium phosphate (DKP) are well known and both used as fertilizers. Since MKP is rather acidic and DKP basic, their mixture would be desirable in various applications, but, unfortunately DKP, its price notwithstanding, is not a simple material for storage and manipulation, being inherently unstable in regard to water content. It is therefore an object of the invention to provide an easy to manipulate and stable solid fertilizer comprising potassium phosphates, as well as a method for cheaply manufacturing such fertilizer.

It is a further object of the invention to provide a particulate, non-caking, free-flowing, fertilizer providing a pH between 5 and 8 when dissolved in water.

It is another object of this invention to provide a solid, particulate fertilizer supplying phosphorus and potassium, easy to store and manipulate.

Other objects and advantages of present invention will appear as description proceeds.

SUMMARY OF THE INVENTION

The invention provides a process for manufacturing a solid, particulate fertilizer based on potassium phosphate of the formula $K_3H_3(PO_4)_2$, said process comprising i) providing agriculturally acceptable raw material essentially consisting of monopotassium phosphate ($KH_2PO_4$, MKP); ii) providing agriculturally acceptable raw material essentially consisting of potassium hydroxide (KOH); iii) adding water to said raw MPK in an amount of from 20 to 100 wt %, based on dry weight of the MKP; iv) adding said raw KOH to said MKP and water from step iii in an amount of from about 18 wt % to about 22 wt %, based on dry weights of KOH and MKP; v) heating the mixture of step iv under vacuum and under slow movement at temperatures between about 90° C. and about 140° C., until a homogeneous material containing from about 1 wt % to about 8 wt % water is obtained; and vi) cooling down to ambient temperature; thereby obtaining the particulate fertilizer based on potassium phosphate, freely flowing and without tendency to cake. The acquired properties are best preserved when the product is sealed in plastic containers. In a preferred embodiment of the process of the invention, aid step of heating under vacuum is performed until the water content of the mixture decreases to a value of from 2 wt % to 6 wt % based on the total final product. Said raw KOH preferably contains at least 30 wt % dry KOH, and said raw MKP preferably contains at least 85 wt % dry $KH_2PO_4$. Said MKP is preferably mixed with water in an amount of from about 40 wt % to about 60 wt % based on dry weight of the MKP, followed by adding 50% aqueous KOH in an amount of from 35 wt % to 45 wt % based on dry weight of the MKP. In a process according to the invention, said solid particulate fertilizer consists essentially of lesser amount of water and of potassium phosphate of the formula $K_3H_3(PO_4)_2$, wherein MKP and water and KOH in said steps iii and iv are mixed in ratios of about 1:0.25:0.20 based on dry weights. Said temperature during the evaporation under vacuum is preferably between 100° C. and 130° C., wherein said vacuum comprises a pressure of 100 mbar or less.

The invention relates to a fertilizer essentially consisting of potassium phosphate of the formula $K_3H_3(PO_4)_2$ and of water in an amount of from 0.2 wt % to 8 wt %, preferably from 0.5 wt % to 5 wt %, said fertilizer exhibiting in its x-ray diffractogram a signal corresponding to 2-theta of about 70°. In a preferred embodiment of the invention, a fertilizer is provided which consists of potassium phosphate of the formula $K_3H_3(PO_4)_2$ in an amount of from 92 wt % to 99 wt %, water in an amount of up to 8 wt %, and incidental impurities of up to 5 wt %. The preferred fertilizer according to the invention contains potassium phosphate of the formula $K_3H_3(PO_4)_2$ in an amount of at least 95 wt %, and water and incidental impurities of up to 5 wt %.

The fertilizer of the invention is a stable particulate material without tendency to cake. In one aspect of the invention, the fertilizer is dispersed directly onto soil; in another aspect of the invention, the fertilizer is used in the preparation of fertilizer compositions providing potassium and phosphorus, which further comprise other components selected from nitrogen source, additional potassium or phosphorus nutrients, microelements, stimulants, pesticides, and surfactants. The particular fertilizer of the invention is a non-dusting material without tendency of caking, exhibiting suitable hygroscopicity, for example 50% when expressed as C.R.U.

The invention is also directed also to fertilizer compositions comprising potassium phosphate of the formula $K_3H_3(PO_4)_2$ exhibiting in its x-ray diffractogram a signal of about 70°, and further comprising other desired elements or components, such as NPK sources and pesticides, for example antifungals.

BRIEF DESCRIPTION OF THE DRAWINGS

The above and other characteristics and advantages of the invention will be more readily apparent through the following examples, and with reference to the appended drawing, wherein:

FIG. 1. shows X-ray diffractograms of potassium phosphate based products.

DETAILED DESCRIPTION OF THE INVENTION

Figure 1A:
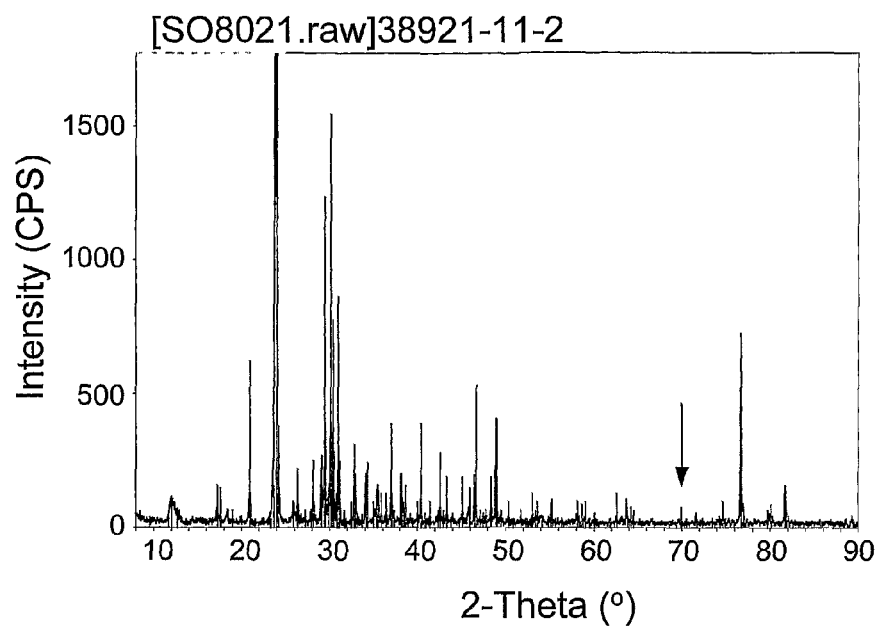
FIG. 1A is a diffractogram of a material obtained by dry mixing MKP with DKP.
Figure 1B:
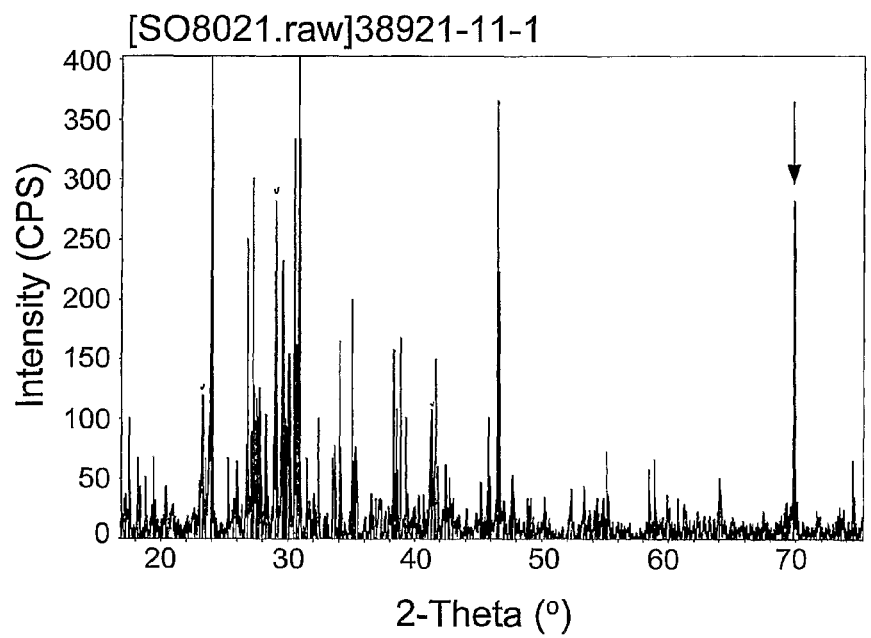
FIG. 1B is a diffractogram of a material obtained according to the invention.

It has now been found that monopotassium phosphate (MKP), when blended with water in an amount not sufficient to dissolve it, and then with potassium hydroxide (KOH), followed by removing most of the water by vacuum evaporation at a temperature of between 100° C. and 130° C., provides a convenient potassium phosphate-based solid fertilizer. Preferably, KOH was added in an amount of about 20 wt % relatively to the MKP, when based on dry weights, and the obtained product showed less than 10 wt % water. The granular, free-flowing solid turned out to be an ideal fertilizer, easily manageable and stable, with a reasonable level of hygroscopicity, with low tendency to caking.

The invention relates to a process of manufacturing a solid, particulate, free-flowing fertilizer with low tendency to caking, essentially consisting of potassium phosphate of the formula $H_3K_3(PO_4)_2$, comprising the steps of providing agriculturally acceptable raw MKP and raw KOH, mixing said MPK with water added to an amount of from 20 to 100 wt % based on dry weight of the MKP, admixing KOH in an amount of from about 18 wt % to about 22 wt % based on dry weights, heating the mixture under vacuum at temperatures of from about 90° C. to about 140° C. while slowly moving said mixture, and cooling the mixture down to ambient temperature. Said raw materials may comprise water in amounts not interfering with the required ratios as defined above, and further incidental impurities which are agriculturally non-harmful; the raw materials may comprise, for example, horticultural grade, technical grade, and food grade. In a preferred embodiment of the invention, the step of heating under vacuum is performed as long as the mixture does not reach the water content of between 1 wt % and 8 wt % based on the total final product weight. Said KOH may contain water, and in one embodiment the KOH is added to said MKP as a water solution, for example a solution of about 50 wt %. In one embodiment of the process according to the invention, MKP is mixed with water in an amount of from about 20 wt % to about 30 wt % based on dry weight of the MKP, followed by adding 50% aqueous KOH in an amount of from 35 wt % to 45 wt % based on dry weight of the MKP. In a preferred embodiment of the invention, solid, particulate, stable fertilizer consisting essentially of lesser amount of water and of potassium phosphate of the formula $K_3H_3(PO_4)_2$ is manufactured by mixing 1 weight part of dry MKP, 0.25 weight part of water, and 0.20 weight part of dry KOH. The above quantities of water are recommended rather in regard to minimal needed amounts; if higher initial amounts of water are present, unnecessary energetic losses will be caused during the drying procedure. The invention is also directed to a solid, particulate fertilizer, not tending to cake, providing approximately 45 wt % of $P_2O_5$ and approximately the same amount of $K_2O$. A fertilizer according to the invention may contain water in an amount of from 1 to 12 wt %, preferably in an amount of up to 8 wt %, for example in an amount of about 2 to 5 wt %, and further minor incidental impurities, acceptable in agriculture.

In one embodiment, a fertilizer according to the invention is a free-flowing powder, stable under storage, which easily dissolves in water providing a clear 1 wt % solution. A fertilizer according to the invention may provide turbid solutions, if containing minor insoluble components. An aqueous solution of the fertilizer according to the invention usually has a pH of about 6.8.

The fertilizer of the invention consists essentially of potassium phosphate of formula $H_3K_3(PO_4)_2$; it means that the fertilizer contains mainly, for example between 80 wt % and 98 wt %, potassium phosphate of said formula, preferably between 95 wt % and 99 wt %, the remainder being predominantly water. The above formula corresponds to the equimolar mixture of MKP and DKP. As explained above, DKP, although a desired fertilizer, is difficult to work with. The fertilizer of the invention provides the same composition as a mixture of MKP with DKP, but without need to purchase or obtain said DKP, and without need to store it and work with it. For the sake of comparison, powders of MKP and DKP were mixed and the resulting mixture was compared with a fertilizer of the invention; the freely flowing fertilizer of the invention, not tending to caking, had better consistency than said simple mix of MKP and DKP. The fertilizer obtained according to the invention is cheaper than a mere MKP/DKP mix, and is more suitable for agricultural applications. The two materials are also distinguished by their physico-chemical characteristics, for example by XRD; the fertilizer of the invention exhibits, for example, in its diffractogram a signal around the angle of 70° which is missing in the diffractogram of said simple MKP/DKP mix. This line may correspond to a double salt of the formula $KH_2PO_4.K_2HPO_4.2H_2O$; nevertheless, the fertilizer of the invention is more easily obtained than a simple MKP/DKP mix, is cheaper, easier to use, and differs in its physical properties. The fertilizer of the invention is granular, easily manageable, free-flowing solid with a desired level of hygroscopicity and a low tendency to caking, obtained in a process which includes blending of MKP and KOH in the presence of water followed by removing most of the water by vacuum evaporation at higher temperatures.

The invention provides a well soluble particulate solid, which is a superior potassium and phosphorus source for fertilization. The fertilizer obtained can be easily stored, shipped and applied to the areas to be fertilized.

The fertilizer of the present invention, consisting essentially of phosphates of the formula $K_3H_3(PO_4)_2$, can be used in preparing composition comprising other important elements of desired components. The compositions of the invention can be ground, sieved and packed, e.g., in bags, for storage, transportation and selling to users.

EXAMPLE 1

A batch of the fertilizer of the invention was prepared in a reactor by mixing 1500 kg technical MKP, 560 kg aqueous KOH of about 50%, and about 375 kg water. The order of the addition of the components to the reactor was important: MKP first, followed by water, and finally KOH. The addition of KOH was accompanied by the release of neutralization heat which caused the temperature to increase up to 60-65° C. The mixture was warmed by steam until the temperature reached 115° C., followed by the activation of vacuum during constant stirring until the water was extracted and the reaction mixture reached the temperature of 120° C. Next, the mixture was cooled to the temperature of 45° C. by cold water, while the vacuum was stopped when the temperature reached 105° C.

The cooled mixture had a uniform particle size, with the following chemical and physical characteristics:
Water was about 0.3 wt % (lost at 100° C.); water loss on heating at 300° C. was 4.5 wt %; $P_2O_5$ was 45.2%, $K_2O$ was 43.9%, CaO was 350 ppm, $SO_4$ was 0.43%; relative flowability was 93.4% (100% MKP); turbidity of 1% water solution was 5 NTU, and pH was 6.8; hygroscopicity was 50% C.R.H (critical relative humidity).

EXAMPLE 2

For the sake of comparison, three materials were prepared in two different ways: (i) physical blending of 43.9% MKP and 56.1% DKP; and (ii) and preparing an "in situ" mixture by the reaction between MKP and KOH in the presence of water, and drying by vacuum while stirring, which is the method of the present invention. The resulting products were similar in their chemical and physical characteristics. However, an x-ray analysis of the two products revealed a high peak typical of a double salt in the fertilizer obtained from the novel process.

EXAMPLE 3

A mixture of N:P:K with the desired nutrient composition of 22:22:22, relating to $N:P_2O_5:K_2O$, was obtained by blending a fertilizer according to the invention and urea in a weight ratio of about 1:1. The resulted mixture was analyzed and found to contain 0.86% water (lost at 100° C.), hygroscopicity 50% C.R.H., and turbidity of 1% solution was 15 NTU, and pH=6.85. Only slight caking was observed.

A mixture of N:P:K with the desired nutrient composition of 7:22:45, relating to $N:P_2O_5:K_2O$, was obtained by blending a fertilizer according to the invention and $KNO_3$ in a weight ratio of about 1:1. The resulted mixture showed only slight caking.

A mixture of N:P:K with the desired nutrient composition of 11:35:14, relating to $N:P_2O_5:K_2O$, was obtained by blending a fertilizer according to the invention and $NH_4H_2PO_4$ and $(NH_4)_2SO_4$ in a weight ratio of about 1:1:1. The resulted mixture showed only slight caking.

While this invention has been described in terms of some specific examples, many modifications and variations are possible. It is therefore understood that within the scope of the appended claims, the invention may be realized otherwise than as specifically described.

The invention claimed is:

1. A process for manufacturing a solid, particulate fertilizer based on potassium phosphate of the formula $K_3H_3(PO_4)_2$, said process comprising
   i) providing agriculturally acceptable raw material essentially consisting of monopotassium phosphate ($KH_2PO_4$, MKP);
   ii) providing agriculturally acceptable raw material essentially consisting of potassium hydroxide (KOH);
   iii) adding water to said MPK in an amount of from 20 to 100 wt%, based on dry weight of the MKP;
   iv) adding said raw KOH to said MKP and water from step iii) in an amount of from about 17 wt% to about 23 wt%, based on dry weights of KOH and MKP;
   v) heating the mixture of step iv) under movement at temperatures of up to about 140° C., comprising vacuum, until a homogeneous material containing from about 0.2 wt% to about 8 wt% water is obtained; and
   vi) cooling the mixture of step v) down to ambient temperature;
   thereby obtaining the particulate fertilizer based on potassium phosphate, freely flowing and without tendency to cake.

2. The process according to claim 1, wherein said step of heating is performed until said homogeneous material contains from about 0.5 wt% to about 5 wt% water.

3. The process according to claim 1, wherein said step of heating comprises increasing the temperature under normal pressure to between 110° C. and 120° C., followed by applying vacuum while maintaining the mixture at a temperature between 110° C. and 140° C.

4. The process according to claim 1, wherein said raw KOH contains at least 30 wt% dry KOH, and is added in an amount of from 18 wt% to 22 wt%, based on dry weight of KOH and MKP.

5. The process according to claim 1, wherein said raw MKP contains at least 95 wt% dry $KH_2PO_4$.

6. The process according to claim 1, wherein said MKP is mixed with water in an amount of from about 40 wt% to 60 wt% based on dry weight of the MKP, followed by adding 50 wt% aqueous KOH in an amount of from 35 wt% to 45 wt% based on dry weight of the MKP.

7. The process according to claim 1, wherein said solid, particulate fertilizer consists essentially of potassium phosphate of the formula $K_3H_3(PO_4)_2$ and from 0.2 wt% to about 8 wt% water, and wherein dry MKP and water and dry KOH in said steps iii) and iv) are present in weight ratios of about 1 / 0.50 / 0.20.

8. The process according to claim 1, wherein said temperature is between 100° C. and 130° C.

9. The process according to claim 1, wherein said vacuum comprises a pressure of 100 mbar or less.

* * * * *